(12) United States Patent
Hu

(10) Patent No.: US 12,549,234 B2
(45) Date of Patent: Feb. 10, 2026

(54) MEASUREMENT PARAMETER DETERMINATION METHOD, TERMINAL DEVICE, CHIP, AND STORAGE MEDIUM

(71) Applicant: GUANGDONG OPPO MOBILE TELECOMMUNICATIONS CORP., LTD., Dongguan (CN)

(72) Inventor: Rongyi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 326 days.

(21) Appl. No.: 18/210,148

(22) Filed: Jun. 15, 2023

(65) Prior Publication Data
US 2023/0327731 A1    Oct. 12, 2023

Related U.S. Application Data

(63) Continuation of application No. PCT/CN2020/136973, filed on Dec. 16, 2020.

(51) Int. Cl.
*H04B 7/06* (2006.01)
*H04L 5/00* (2006.01)

(52) U.S. Cl.
CPC ......... *H04B 7/0626* (2013.01); *H04L 5/0051* (2013.01)

(58) Field of Classification Search
CPC ............................ H04B 7/0626; H04L 5/0051
USPC ....................................................... 370/329
See application file for complete search history.

(56) References Cited

U.S. PATENT DOCUMENTS

| | | | | |
|---|---|---|---|---|
| 2019/0253906 A1* | 8/2019 | Lin | ........................ | H04W 24/10 |
| 2019/0306734 A1 | 10/2019 | Huang et al. | | |
| 2020/0154449 A1* | 5/2020 | Akkarakaran | ........ | H04W 72/56 |
| 2022/0078744 A1* | 3/2022 | Manolakos | ........... | G01S 5/0045 |
| 2023/0020648 A1* | 1/2023 | Cha | ........................ | G01S 5/0036 |
| 2024/0237035 A1* | 7/2024 | Chervyakov | ........ | H04W 72/51 |

FOREIGN PATENT DOCUMENTS

| | | |
|---|---|---|
| CN | 110557976 A | 12/2019 |
| CN | 111742596 A | 10/2020 |
| CN | 111866925 A | 10/2020 |
| WO | 2019193125 A1 | 10/2019 |
| WO | 2019223515 A1 | 11/2019 |

OTHER PUBLICATIONS

U.S. Appl. No. 63/076,668, filed Sep. 10, 2020.*
U.S. Appl. No. 63/025,932, filed May 15, 2020.*
Extended European Search Report issued in corresponding European application No. 20965473.0, mailed Jan. 26, 2024.

(Continued)

*Primary Examiner* — Faisal Choudhury
(74) *Attorney, Agent, or Firm* — BAYES PLLC

(57) ABSTRACT

The present application relates to a measurement parameter determination method, a terminal device, a chip, and a storage medium, the method comprising: on the basis of the processing time of a plurality of measurement objects, determining measurement parameters of a target measurement object amongst the plurality of measurement objects, the measurement parameters being used for determining the measurement cycle of the target measurement object.

12 Claims, 5 Drawing Sheets

---

S40 determining a measurement parameter of a target measurement object among a plurality of measurement objects according to the processing time of the plurality of measurement objects; wherein the measurement parameter is used to determine a measurement cycle of the target measurement object

(56) References Cited

OTHER PUBLICATIONS

Title: Scaling for measurements of multiple frequency layers with gaps; Source: Ericsson 3GPP TSG-RAN WG4 Meeting #85 R4-1712486 Reno, USA, Nov. 27-Dec. 1, 2017.
Source: Intel Corporation; Title: Further Discussion on NR PRS RSTD Requirements 3GPP TSG-RAN WG4 Meeting # 96-e R4-2009741 Electronic Meeting, Aug. 17-28, 2020.
Source: vivo; Title: Discussion on potential positioning enhancements 3GPP TSG RAN WG1 #103-e R1-2007666 e-Meeting, Oct. 26-Nov. 13, 2020.
Huawei et al., "Discussion on CSI-RS Measurement Period", R4-1800662, 3GPP TSG-RAN WG4 Meeting AH 1801 San Diego, US, Jan. 22-26, 2017.
International Search Report issued in international application No. PCT/CN2020/136973, mailed Sep. 16, 2021.
Written Opinion of the International Searching Authority issued in international application No. PCT/CN2020/136973, mailed Sep. 16, 2021.
Qualcomm Incorporated, "On new MG patterns for NR positioning", R4-2009879, 3GPP TSG-RAN WG4 Meeting #96-e Online, Aug. 17-28, 2020.
Huawei et al., "WF on UE PRS measurement requirements", R4-2017372, 3GPP TSG-RAN WG4 Meeting #97-e Electronic Meeting, Nov. 2-13, 2020.
3GPP TS 38.133 V16.4.0 (Jun. 2020); Technical Specification Group Radio Access Network; NR; Requirements for support of radio resource management (Release 16).

\* cited by examiner

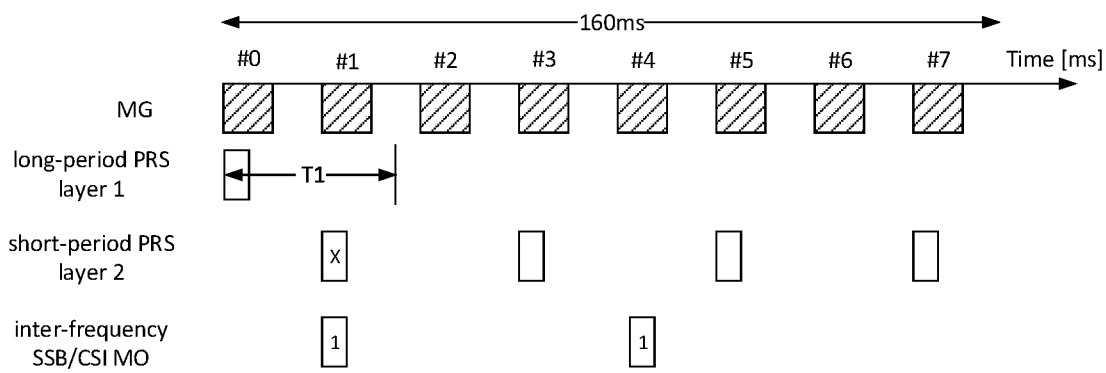
FIG. 4
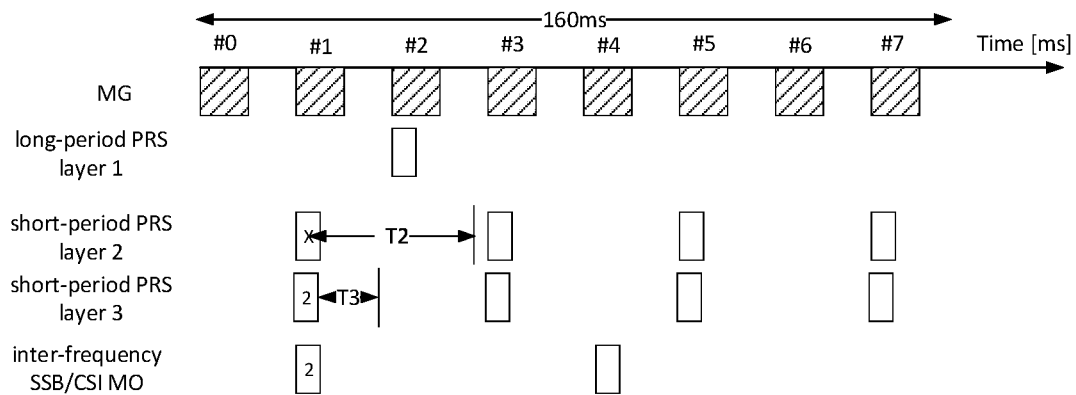
FIG. 5
FIG. 6

MEASUREMENT PARAMETER DETERMINATION METHOD, TERMINAL DEVICE, CHIP, AND STORAGE MEDIUM

CROSS-REFERENCE TO RELATED APPLICATION

The present application is a continuation of International Application No. PCT/CN2020/136973, filed on Dec. 16, 2020, which is incorporated herein by reference in its entirety.

TECHNICAL FIELD

The present disclosure relates to the communication field, and more specifically, relates to a method for determining a measurement parameter, a terminal device, a chip, a computer-readable storage medium, a computer program product, and a computer program.

BACKGROUND

Generally, in a wireless communication system, a terminal device will measure a reference signal of a cell, so as to obtain relevant information of the cell according to the measurement result. For example, the positioning measurement is realized based on the measurement of the positioning reference signal (PRS), or the measurement of the radio resource management (RRM) is realized based on the measurement of the synchronization signal block (SSB), etc.

In practical applications, there are requirements for different measurement objects to share measurement resources.

SUMMARY

In view of this, embodiments of the present application provide a method for determining a measurement parameter, a terminal device, a chip, a computer-readable storage medium, a computer program product, and a computer program.

The embodiment of the present application provides a measurement parameter determining method, including:
  determining a measurement parameter of a target measurement object among a plurality of measurement objects according to processing times of the plurality of measurement objects, wherein the measurement parameter is used to determine a measurement cycle of the target measurement object.

The embodiment of the present application provides a terminal device, including:
  a first processing module, configured to determine a measurement parameter of a target measurement object among a plurality of measurement objects according to processing times of the plurality of measurement objects, wherein the measurement parameter is used to determine a measurement cycle of the target measurement object.

The embodiment of the present application also provides a terminal device, including: a processor and a memory, the memory is used to store a computer program, and the processor invokes and runs the computer program stored in the memory to execute the above measurement parameter determining method.

The embodiment of the present application also provides a network device, including: a processor and a memory, the memory is used to store a computer program, and the processor invokes and runs the computer program stored in the memory to execute the above measurement parameter determining method.

The embodiment of the present application also provides a chip, including: a processor, configured to invoke and run a computer program from a memory, so that a device equipped with the chip executes the above measurement parameter determining method.

The embodiment of the present application also provides a computer-readable storage medium for storing a computer program, wherein the computer program causes a computer to execute the above measurement parameter determining method.

The embodiment of the present application further provides a computer program product, including computer program instructions, wherein the computer program instructions cause a computer to execute the above measurement parameter determining method.

The embodiment of the present application further provides a computer program, which enables a computer to execute the above measurement parameter determining method.

BRIEF DESCRIPTION OF THE DRAWINGS

FIG. 4 is a flowchart of a method for determining a measurement parameter according to an embodiment of the present application.

FIG. 5 is a schematic diagram of application example 1 of the method for determining the measurement parameters of the present application.

FIG. 6 is a schematic diagram of application example 2 of the method for determining the measurement parameters of the present application.

DETAILED DESCRIPTION

Figure 1:
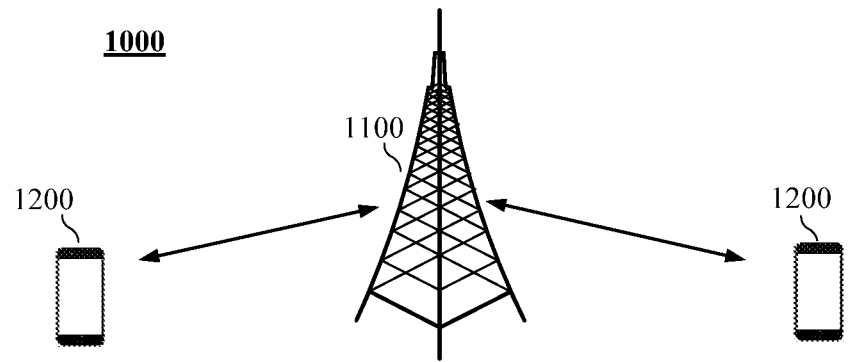
FIG. 1 is a schematic diagram of a communication system architecture according to an embodiment of the present application.

Hereinafter, technical solutions in the embodiments of the present application will be described with reference to the drawings in the embodiments of the present application.

The technical solutions of the embodiments of the present application can be applied to various communication systems, specifically, it can be applied to terminal device in the communication system, and is used for the terminal device to perform measurement on the measurement objects (MO) of the PRS frequency layer, SSB, channel state information reference signal (CSI-RS), evolved universal terrestrial radio access (E-UTRA) reference signal time difference (RSTD) and the like.

The various communication systems include for example: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, LTE-based access to unlicensed spectrum, (LTE-U) system, NR-based access to unlicensed spectrum (NR-U) system, Non-Terrestrial Networks (NTN) system, Universal Mobile Telecommunications System (UMTS), Wireless Local Area Networks (WLAN), Wireless Fidelity (WiFi), fifth-generation communication (5th-Generation, 5G) system or other communication systems, etc.

Generally speaking, the number of connections supported by traditional communication systems is limited and easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., the embodiments of the present application may also be applied to these communication systems.

Optionally, the communication system in the embodiment of the present application can be applied to a carrier aggregation (CA) scenario, a dual connectivity (DC) scenario, or a standalone (SA) deployment scene.

In the embodiments of the present application, the terminal device may perform measurement on the measurement objects from the network device in the communication system. Wherein, the terminal device may also be referred to as user equipment (UE), access terminal, user unit, user station, mobile station, mobile site, remote station, remote terminal, mobile device, user terminal, terminal, wireless communication device, user agent or user device, etc.

The terminal device can be a station (ST) in a WLAN, a cellular phone, a cordless phone, a Session Initiation Protocol (SIP) phone, a Wireless Local Loop (WLL) station, a Personal Digital Assistant (PDA) device, handheld devices with wireless communication functions, computing devices or other processing devices connected to wireless modems, vehicle-mounted devices, wearable devices, next-generation communication systems such as terminal devices in NR networks, or the terminal device in a future evolved public land mobile network (PLMN) network, etc.

In the embodiment of this application, the terminal device can be deployed on land, including indoor or outdoor, handheld, wearable or vehicle-mounted; the terminal device can also be deployed on water (such as ships, etc.); the terminal device can also be deployed in the air (such as aircraft, balloons and satellites).

In this embodiment of the application, the terminal device may be a mobile phone, a tablet computer (Pad), a computer with a wireless transceiver function, a virtual reality (VR) terminal device, an augmented reality (AR) terminal device, wireless terminal devices in industrial control, wireless terminal devices in self driving, wireless terminal devices in remote medical, wireless terminal devices in smart grid, wireless terminal device in transportation safety, wireless terminal device in smart city, or wireless terminal device in smart home.

As an example but not a limitation, in this embodiment of the present application, the terminal device may also be a wearable device. Wearable devices can also be called wearable smart devices, which is a general term for the application of wearable technology to intelligently design daily wear and develop wearable devices, such as glasses, gloves, watches, clothing and shoes. A wearable device is a portable device that is worn directly on the body or integrated into the user's clothing or accessories. Wearable devices are not only a hardware device, but also achieve powerful functions through software support, data interaction, and cloud interaction. Generalized wearable smart devices include those of full-featured, large-sized, complete or partial functions without relying on smart phones, such as smart watches or smart glasses, etc., and those only focus on a certain type of application functions, and need to cooperate with other devices such as smart phones, such as various smart bracelets and smart jewelry for physical sign monitoring.

In the embodiment of this application, the network device may be a device used to communicate with mobile devices, and the network device may be an access point (AP) in WLAN, a base transceiver station (BTS) in GSM or CDMA, or a base station (NodeB, NB) in WCDMA, or an evolved base station (Evolutional Node B, eNB or eNodeB) in LTE, or a relay station or an access point, or a vehicle-mounted device, a wearable device, and a network device (gNB) in an NR network, or the network device in the future evolution of the PLMN network, etc.

As an example but not a limitation, in this embodiment of the present application, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station installed on land, water, and other locations.

In this embodiment of the application, the network device may provide services for a cell, and the terminal device communicates with the network device through the transmission resources (for example, frequency domain resources, or spectrum resources) used by the cell. The cell may be a cell corresponding to a network device (e.g., a base station), the cell may belong to a macro base station, or a base station corresponding to a small cell, wherein the small cell may include: Metro cell, Micro cell, Pico cell, Femto cell, etc. These small cells have the characteristics of small coverage and low transmission power, and are suitable for providing high-speed data transmission services.

FIG. 1 schematically shows a wireless communication system 1000 including a network device 1100 and two terminal devices 1200, optionally, the wireless communication system 1000 may include multiple network devices 1100, and the coverage of each network device 1100 may include other numbers terminal device, which is not limited in the embodiment of this application. Optionally, the wireless communication system 1000 shown in FIG. 1 may further include other network entities such as a mobility management entity (MME), an access and mobility management function (AMF), etc., which is not limited in the embodiment of the application.

It should be understood that the terms "system" and "network" are often used interchangeably herein. The term "and/or" in this article is an association relationship describing associated objects, which means that there can be three relationships for the related objects, for example, A and/or B can mean these three situations: A exists alone, A and B exist simultaneously, and B exists alone. The character "/" in this article generally indicates that the contextual objects are an "or" relationship.

Currently, the measurement of NR PRS is performed within the measurement gap (MG). Therefore, the measurement cycle is related to the sharing scheme of the measurement object in the MG. Wherein, by setting a carrier-specific scaling factor (CSSF), the MG sharing is realized based on the CSSF.

Specifically, for measurement objects with high priority, such as long-period E-UTRA RSTD or long-period NR PRS, the CSSF of the measurement object can be set to 1, indicating that the corresponding measurement object does not need to share MG with other measurement objects.

For at least two measurement objects with low priority, such as short-period PRS, SSB, and CSI-RS for inter-frequency measurement, the MG needs to be shared. An exemplary implementation is, according to the measurement object i within the preset time domain range, the CSSF of the measurement object i, denoted as $CSSF_{within\_gap,i}$ is determined according to the number of intra-frequency measurement object $M_{intra,i,j}$, the number of inter-frequency measurement object $M_{inter,i,j}$, the number of all frequency measurement object $M_{tot,i,j}$, the parameter measGapSharingScheme, and the available MG ratio information within the preset time domain range $R_i$, of the measurement object i in each MG within the preset time domain range, such as the j-th MG.

In the embodiment, $M_{tot,i,j}=M_{intra,i,j}+M_{inter,i,j}$. The parameter measGapSharingScheme is used to indicate that the MG sharing scheme is an equal sharing scheme or a non-equal sharing scheme. When the MG sharing scheme is a non-equal sharing scheme, the parameter measGapSharingScheme is also used to indicate the intra-frequency coefficient $K_{intra}$ and the inter-frequency coefficient $K_{inter}$ in the non-equal sharing scheme.

Specifically, when the preset time domain range is 160 ms,

If the parameter measGapSharingScheme indicates that the scheme of sharing MG is an equal sharing scheme, then:

$CSSF_{within\_gap,i}=\max(\text{ceil}(R_i \lambda M_{tot,i,j})), j=0 \ldots (160/MGRP)-1;$     Formula 1)

In the embodiment, the MGRP is the measurement gap repetition period.

If the parameter measGapSharingScheme indicates that the scheme of sharing MG is a non-equal sharing scheme, then:

For the intra-frequency measurement object i, $CSSF_{within\_gap,i}$ is the maximum of the following values:

$\text{ceil}(R_i \times K_{intra} \times M_{intra,i,j}), M_{inter,i,j} \neq 0, j=0,1,\ldots,$
   $((160/MGRP)-1);$ and $\text{ceil}(R_i \times M_{intra,i,j}), M_{inter,i,j}=0, j=0 \ldots (160/MGRP)-1.$     Formula (2)

For the inter-frequency measurement object i, $CSSF_{within\_gap,i}$ is the maximum of the following values:

$\text{ceil}(R_i \times K_{inter} \times M_{inter,i,j}), M_{intra,i,j} \neq 0, j=0 \ldots$
   $(160/MGRP)-1;$ and $\text{ceil}(R_i \times M_{inter,i,j}), j=0 \ldots (160/MGRP)-1.$     Formula(3)

In the embodiment, the measurement object i is generally a periodic signal, which includes multiple signals within the preset time domain range, and each signal is located in one MG, then these MGs are MGs that can use the measurement object i as a candidate measurement object. Among the MGs that can use the measurement object i as a candidate measurement object, there may be MGs for processing other measurement objects with high priority, so that these MGs cannot be used for measurement of the measurement object i. Therefore, in the related art, the available MG of the measurement object i includes the MG that is not used to process other high-priority measurement objects among the MGs that can use the measurement object i as a candidate measurement object; and the available MG ratio information $R_i$ within the preset time domain range is the maximum ratio of the MG that can use the measurement object i as a candidate measurement object to the available MG of the measurement object i within the preset time domain range. That is to say, $R_i$ is the maximum ratio between the number of all MGs where the measurement object i is located and the number of available MGs for the measurement object i within the preset time domain range.

In the above scheme of sharing MG, for the case where there are multiple measurement objects in one MG, the $M_{intra,i,j}$, $M_{inter,i,j}$ and $M_{tot,i,j}$ are used to calculate the CSSF, which can Avoid competing conflicts between multiple measurement objects caused by this situation.

However, in the NR system, the ability of the terminal device to process the PRS has certain limitations. For example, the downlink PRS processing capability of the terminal device UE is as follows:

The UE reports the combination of (N, T) values for each frequency band, wherein N the duration of processing downlink PRS symbols every T milliseconds (ms) in the given maximum bandwidth B (in megahertz MHz) supported by the UE (in ms).

The UE supports the following sets of N, T and B values:
N={0.125, 0.25, 0.5, 1, 2, 4, 8, 12, 16, 20, 25, 30, 35, 40, 45, 50} ms;
T={8, 16, 20, 30, 40, 80, 160, 320, 640, 1280} ms; and
B=15, 10, 20, 40, 50, 80, 100, 200, 4001 MHz.

The capability of the UE does not support simultaneous downlink PRS processing, that is, for a UE that supports multiple positioning frequency layers, the UE expects to process one frequency layer at a time.

Figure 2:
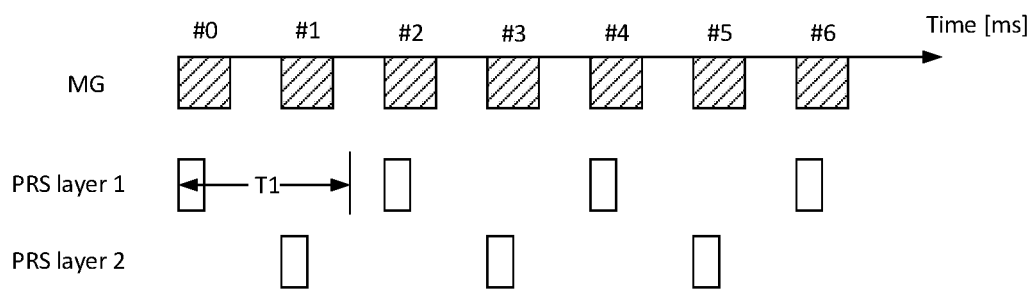
FIG. 2 is a schematic diagram of the PRS frequency layer in the embodiment of the present application.

It can be seen that the UE does not support processing PRS of multiple frequency layers at the same time. This means that a PRS frequency layer with a relatively long processing time will affect subsequent PRS signal reception and processing of other layers. As shown in the PRS signal distribution diagram in FIG. 2, the processing time T1 of the PRS signal located at MG #0 in the frequency layer PRS layer 1 will cover or include MG #1, resulting in that the PRS signal located in MG #1 in the frequency layer PRS layer2 cannot be measured.

According to the CSSF in the above scheme, the method for calculating the measurement cycle of the PRS frequency layer i can refer to the following formula:

Formula (5)

$$T_{PRS-RSTD,i} = \left(CSSF_{PRS,i} * N_{RxBeam,i} * \left\lceil \frac{N_{PRS,i}^{slot}}{N'} \right\rceil \left\lceil \frac{L_{PRS,i}}{N} \right\rceil * N_{sample} - 1\right) *$$

$$T_{effect,i} + T_{last};$$

wherein, $T_{PRS-RSTD,i}$ is the measurement cycle of PRS frequency layer i;

$CSSF_{PRS,i}$ is the CSSF of PRS frequency layer i;

$N_{RxBeam,i}$ is the number of beams for the terminal device to receive the PRS in the PRS frequency layer i;

$N_{PRS,i}^{slot}$ is the maximum number of PRS in each time slot configured for the terminal device by the network equipment;

N' is the number of PRS in each slot determined by the terminal capability;

$L_{PRS,i}$ is the time domain length of the PRS resource, which is related to the number of symbols of the PRS;

N is the duration for processing PRS symbols in every T ms, according to the UE capability;

$N_{sample}$ is the number of samplings for each measurement;

$T_{effect,i}$ is the equivalent cycle, which is related to the PRS resource cycle of PRS frequency layer i, MGRP and the processing capability of UE;

$T_{last}$ is the measurement duration of the last sampling of the PRS RSTD.

The above scheme of sharing MG considers the case where there are multiple measurement objects in the same MG, while does not consider the measurement conflict caused by the processing time of the PRS. Based on this, a scaling factor A can be introduced to calculate the measurement cycle of the PRS frequency layer i. An exemplary manner is to calculate the measurement cycle of the PRS frequency layer i according to the following formula:

Formula (6)

$$T_{PRS-RSTD,i} = \left(CSSF_{PRS,i} * N_{RxBeam,i} * \left\lceil \frac{N_{PRS,i}^{slot}}{N'} \right\rceil \left\lceil \frac{L_{PRS,i}}{N} \right\rceil * N_{sample} - 1\right) *$$

$$A * T_{effect,i} + T_{last}$$

Wherein, the specific meaning of each variable may refer to the above-mentioned MG sharing scheme.

An exemplary value scheme of the scaling factor A is that A is the number of PRS involved in the measurement conflict caused by the processing time of the PRS frequency layer i.

The above processing method of introducing the scaling factor A has the following problems:

First of all, this method can only deal with the conflict caused by PRS processing time in the PRS frequency layer with the same priority, while does not consider the conflict caused by the processing time between long-period PRS and short-period PRS, and therefore cannot effectively optimize the measurement cycle.

Secondly, this method only considers the impact on the PRS frequency layer i of the measurement conflict caused by the processing time of PRS frequency layer i, while does not consider the impact on other PRS frequency layer of the measurement conflict caused by the processing time of the PRS frequency layer i. For example, referring to FIG. 2, the scaling factor provided by this method is only applied to the PRS layer 1. But in fact, the measurement of PRS layer 1 in MG #0 and the measurement of PRS layer 2 in MG #1 cannot be performed at the same time, so the above method will cause a failure of the measurement cycle of PRS layer 2. For example, assuming that for the PRS layer 1, $N_{RxBeam,1}=1$, and $$\left\lceil \frac{N_{PRS,i}^{slot}}{N'} \right\rceil \left\lceil \frac{L_{PRS,i}}{N} \right\rceil = 1,$$

while for PRS layer 2, $N_{RxBeam,2}=1$, and $$\left\lceil \frac{N_{PRS,i}^{slot}}{N'} \right\rceil \left\lceil \frac{L_{PRS,i}}{N} \right\rceil = 4,$$

then even without scaling, PRS layer 2 has a measurement cycle that is A times greater than PRS layer 1.

Figure 3:
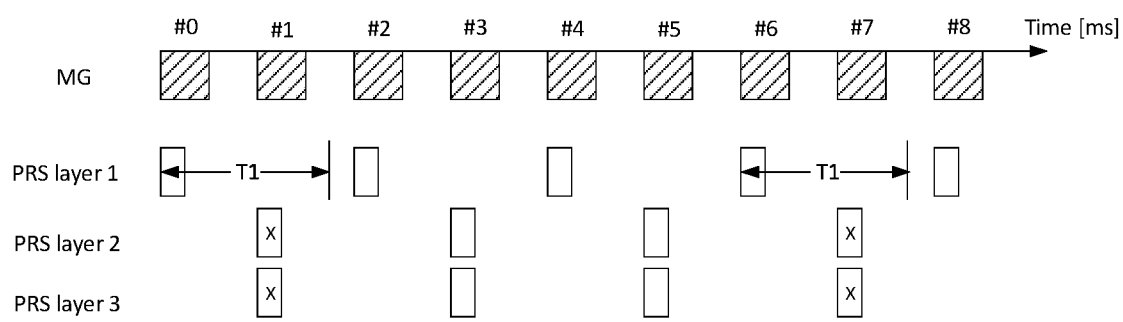
FIG. 3 is another schematic diagram of the PRS frequency layer in the embodiment of the present application.

Thirdly, since the measurement period of the short-period PRS layer with low priority has already been adjusted the through the CSSF, and the sharing has been realized and it will not be measured at the same time. Accordingly, the value of A in the above scheme is easy to be too large, resulting in an unreasonable measurement period. For example, as shown in FIG. 3, the processing time T1 of the PRS in MG #0 in PRS layer 1 conflicts with the PRS measurement in MG #1 in PRS layer 2 and PRS layer 3. However, PRS layer 2 and layer 3 are competing for MG #1 through CSSF=2. Therefore, it is not necessary to repeatedly count the number of PRSs in MG #1 as 2. According to the above method, for the PRSS layer 1, $CSSF_{PRS,1}=1$, and $A_{PRS,1}=3$. If for the PRS layer 2, $CSSF_{PRS,2}=2$, and $A_{PRS,2}=1$, the final total period value will be wrong. If $A_{PRS,2}=3$, it will lead to over-amplification of the measurement cycle.

The solutions provided in the embodiments of the present application are mainly used to solve at least one of the above problems.

In order to understand the characteristics and technical contents of the embodiments of the present disclosure in more detail, the implementation of the embodiments of the present disclosure will be described in detail below in conjunction with the accompanying drawings. The attached drawings are only for reference and description, and are not intended to limit the embodiments of the present disclosure.

Referring to FIG. 4, an embodiment of the present application provides a method for determining a measurement parameter, which can be performed by a terminal device, and the method includes:

Step S40, determining a measurement parameter of a target measurement object among a plurality of measurement objects according to the processing time of the plurality of measurement objects; wherein the measurement parameter is used to determine a measurement cycle of the target measurement object.

In the embodiment, the plurality of measurement objects may include at least one of PRS frequency layer, SSB, and CSI-RS. Wherein, the target measurement object may refer to a measurement object whose measurement parameters are to be determined, or in other words, the target measurement object is a specified measurement object among multiple measurement objects, and the above method may be used to determine the measurement parameters for the specified measurement object.

In the above method, the measurement parameter of the target measurement object in the plurality of measurement objects are determined according to the processing time of the plurality of measurement objects. Therefore, it is possible to avoid conflicts in the measurement of the plurality of measurement objects due to the processing time, and to optimize the measurement parameter and the measurement cycle.

Exemplarily, the plurality of measurement objects include a first measurement object and a second measurement object, and the target measurement object is at least one of the first measurement object and the second measurement object. The first measurement object includes a first signal to be measured, and the second measurement object includes a second signal to be measured. Correspondingly, in step S40, determining the measurement parameters of the target measurement object among the plurality of measurement objects according to the processing time of the plurality of measurement objects may include:

determining the measurement parameter of the target measurement object in the case when the first signal to be measured is within the processing time of the second signal to be measured.

Generally, the measurement object is a periodic signal, and within a certain time domain range, the measurement object includes at least one signal. The terminal device receives the signal and measures the signal according to the measurement cycle. Based on this, in the embodiment of the present application, the signal to be measured may refer to a signal of a measurement object at a certain receiving position, or referred to as a measurement object at a certain receiving position. The processing time of the measurement object or the signal to be measured may include the receiving time and/or measurement time of the object to be measured or the signal to be measured.

Exemplarily, the signal to be measured may be a reference signal, and the measurement object may be a frequency layer. For example, the signal to be measured is the positioning reference signal PRS, and the measurement object is the PRS frequency layer. The corresponding relationship between the signal to be measured and the measurement object is generally one-to-one or many-to-one. For example, within a certain time domain range, a measurement object may include one signal to be measured or multiple signals to be measured.

According to the above-mentioned embodiment, the first signal to be measured is located within the processing time of the second signal to be measured, that is to say, the processing time of the second signal to be measured includes the time domain position of the first signal to be measured, or first signal to be measured exists during the processing time of the second signal to be measured. Therefore, the terminal device cannot process the first signal to be measured and the second signal to be measured at the same time, that is, a conflict occurs between the first signal to be measured and the second signal to be measured due to processing time.

Generally speaking, the periodic signal of the measurement object is configured in the MG, therefore, the time domain position of the measurement object can be represented by the MG. Wherein, MG is a periodic time-domain unit, and the period of MG is MGRP. For example, if the MGRP is 20 ms, then there are 8 MGs in 160 ms, if the duration of each MG is 10 ms, then in 160 ms, the MGs are numbered from 0, the 0-th MG may be from the 1st to 10th ms, the 1-st MG can be from the 21st to 30th ms, and so on, and the 7-th MG can be from the 141st to 150th ms.

Taking the MG as an example to characterize the time domain position of the measurement object, for PRS i in the j-th MG located within the preset time domain range, the conflict between the PRS i and PRS i2 due to processing time, including the following cases:

Case 1: PRS i is located in the j-th MG, PRS i2 is located in the (j-n)-th MG, and the processing time of PRS i2 includes the j-th MG; that is, PRS i is the first measurement object, and PRS i2 is the second measurement object;

Case 2: PRS i is located in the j-th MG, PRS i2 is located in the (j+n)-th MG, and the processing time of PRS i includes the (j+n)-th MG; that is, PRS i is the second measurement object, PRS i2 is the first measurement object.

In the embodiments, j and n are both positive integers.

In the embodiment of the present application, it will be judged whether the first signal to be measured is within the processing time of the second signal to be measured. Based on this, it can be determined whether the measurement of the first measurement object and the measurement of the second measurement object are conflicted due to the processing time. When the first signal to be measured is within the processing time of the second signal to be measured, the measurement parameter of the target measurement object is determined according to a preset rule corresponding to the case. Since the relationship between the processing time of the first measurement object and the second measurement object is taken into consideration, it is possible to avoid conflicts in the measurement of different measurement objects due to the processing time, and to optimize the measurement parameters and the measurement cycle.

Optionally, both the first measurement object and the second measurement object include the positioning reference signal PRS frequency layer.

It should be noted that although in the embodiment of the present application, the above method is described by taking the first measurement object and the second measurement object as PRS frequency layers as an example, in practical applications, the first measurement object and the second measurement object may also be other measurement objects, which is not limited in this application. In the case that the capability of the terminal device does not support simultaneous measurement processing on the first measurement object and the second measurement object, the measurement parameter and the measurement cycle can be optimized by using the above method.

Optionally, the priorities of the first measurement object and the second measurement object are different. The target measurement object includes a measurement object with a lower priority among the first measurement object and the second measurement object. For example, if the first measurement object is the short-period PRS frequency layer and the second measurement object is the long-period PRS frequency layer, then the target measurement object is the first measurement object. For another example, if the first measurement object is the long-period PRS frequency layer and the second measurement object is the short-period PRS frequency layer, then the target measurement object is the second measurement object.

According to the above optional method, in the case of conflicts between measurement objects with different priorities due to processing time, special processing is performed for measurement objects with low priority, and priority processing is still maintained for measurement objects with high priority, which can further optimize the measurement cycle.

Optionally, the signal to be measured belonging to the target measurement object among the first signal to be measured and the second signal to be measured is located in the j-th MG within the preset time domain range; wherein, the signal to be measured belonging to the target measurement object among the first signal to be measured and the second signal to be measured can be referred to as the target signal to be measured, and j is a positive integer. That is to say, the target signal to be measured in the target measurement object is located in the j-th MG within the preset time domain range, wherein the target signal to be measured is the first signal to be measured or the second signal to be measured. By configuring the target measurement object in the MG, interference of the signal measurement can be prevented and the measurement reliability can be improved.

In some exemplary embodiments of the present application, the measurement parameter of the target measurement object may include the number of competing objects of the target measurement object in a certain MG, the available MG ratio information of the target measurement object, and the like. Correspondingly, determining the measurement parameter of the target measurement object includes at least one of the following exemplary ways:

Example 1: The number of competing objects of the target measurement object in the j-th MG is determined to be 0.

Exemplarily, the number of competing objects may refer to the number of measurement objects competing for the same MG, for example, the number of competing objects in the j-th MG is the number of measurement objects competing for the j-th MG. The number of competing objects includes the intra-frequency measurement objects, the number of inter-frequency measurement objects, and the total number of measurement objects in the j-th MG.

For example, for the measurement of the PRS in the j-th MG in the short-period PRS layer i, if there is no long-period PRS in the j-th MG, but the PRS layer i conflicts with long-period PRS measurements in other MGs, the short-period PRS layer i is not measurable in the j-th MG. Based on this, the intra-frequency measurement object $M_{inter,i,j}$, the inter-frequency measurement object $M_{inter,i,j}$ and the total number of measurement objects in the j-th MG of the short-period PRS layer i are all determined to be 0, that is, $M_{intra,i,j}=M_{inter,i,j}=M_{tot,i,j}=0$, which means PRS layer i does not perform processing and does not participate in MG competition, so as to measure the long-period PRS in the j-th MG.

Example 2: The available MG of the target measurement object is determined from other MGs except the j-th MG within the preset time domain range, and the available MG ratio information of the target measurement object is determined based on the number of available MGs of the target measurement object.

In the embodiment, the available MG ratio information may be a maximum ratio of the number of all MGs where the target measurement object is located within the preset time domain range and the number of available MGs of the target measurement object. Wherein, the available MGs may refer to MGs that can be used to measure the target measurement object.

According to this exemplary manner, the j-th MG of the target measurement object conflicts with other measurement objects due to processing time, and based on this, the j-th MG does not belong to the available MG of the target measurement object.

Similarly, if the target measurement object conflicts with other high-priority measurement objects due to processing time in other MGs, the other MGs do not belong to the available MGs of the target measurement object.

Optionally, since the target measurement object is a low-priority measurement object, if an MG is used to measure other measurement objects with higher priority than the target measurement object, such as long-period PRS, the MG does not belong to the MG available for the target measurement object.

That is, the available MG of the target measurement object is the MG in which the target measurement object can be taken as the object to be measured in the preset time domain range, or in other words, is the MG among the MGs where the target measurement object is located, in which no measurement conflict between a target measurement object and other measurement objects due to processing time is caused, and which is not used to measure a high-priority measurement object.

Exemplarily, the available MG ratio information of the target measurement object is a ratio $R_1$ of the number of all MGs of the target measurement object i within the preset time domain and the number of available MGs of the target measurement object i.

For example, there are 8 MGs within 160 ms, among which, the short-period PRS layer i is located in the 1st, 3rd, 5th and 7th MG, if the short-period PRS in the 1st MG conflicts with the long-period PRS due to processing time, while in the 3rd MG, and 5th MG, the short-period PRS does not conflict with the long-period PRS due to processing time, and the 3rd and 5th MGs are not used to measure the long-period PRS, and the 7th MG is used for measurement of the long-period PRS, then the number of the MGs in which the short-period PRS layer i is located is 4, and the number of available MGs is 2. Based on this, $R_i=4/2=2$.

In some exemplary embodiments of the present application, not only the measurement parameter of the target measurement object in the first measurement object and the second measurement object are determined based on the conflict between the first measurement object and the second measurement object, but also the measurement parameters of other measurement objects affected by the conflict are determined. Specifically, the method for determining the measurement parameter also includes:

determining a measurement parameter of a third measurement object; wherein, the third measurement object includes a third signal to be measured located at the j-th MG.

Exemplarily, determining the measurement parameter of the third measurement object includes:

determining the number of competing objects of the third measurement object in the j-th MG according to the number of other signals to be measured except the target signal to be measured in the j-th MG.

In the embodiment, the third measurement object can be processed simultaneously with the measurement object with higher priority among the first measurement object and the second measurement object.

According to this exemplary embodiment, the third measurement object can be measured in the j-th MG, but it does not need to compete with the target measurement object, which is represented in the fact that when counting the inter-frequency measurement object $M_{inter}$ and the total number of measurement objects $M_{tot}$, the target measurement objects such as short-period PRS frequency layers are not included in the statistics.

For example, in the j-th MG, there are short periods PRS1, SSB1 and SSB2. A conflict occurs between the short-period PRS 1 and the long-period PRS due to processing time, and the short-period PRS 1 sets the number of competing objects to 0 and does not participate in MG competition. For the measurement object SSB1 that can be processed simultaneously with the long-period PRS, since the short-period PRS1 quits the competition, when counting the number of competing objects, the short-period PRS1 is not included in the statistics, while SSB2 can be included in the statistics. Accordingly, in the j-th MG, competing objects include SSB1 and SSB2, and the number of competing objects is 2.

Exemplarily, the third measurement object includes at least one of the following:
the synchronization signal block SSB;
the channel state information reference signal CSI-RS.

It should be noted that, although the SSB and CSI-RS are used as examples to describe the third measurement object, the present application is not limited thereto, and the third measurement object may be a measurement object that do not conflict with the measurement object with higher priority among the first measurement object and the second measurement object.

In some embodiments, when the target measurement object includes the second measurement object, the third measurement object may further include:
the PRS frequency layer with the same priority as the target measurement object;
wherein, the processing time of the third signal to be measured in the PRS frequency layer having the same priority as the target measurement object does not include the MG where the first signal to be measured is located.

For example, the first measurement object is the long-period PRS, and the second measurement object is the short-period PRS 1. Since the processing time of the short-period PRS in the j-th MG is too long, it covers the MG in which the following long-period PRS is located, which makes the short-period PRS 1 in the j-th MG quite competition. However, there are short-period PRS 2 and SSB1 in the j-th MG, and the processing time of the short-period PRS 2 is short, which does not include the MG where the long-period PRS is located. Therefore, the short-period PRS 2 can compete with the SSB1 for the MG. For the short-period PRS 2, when counting the number of competing objects, PRS 1 is not included in the statistics, and SSB1 is included in the statistics, so the number of competing objects in the short-period PRS 2 is 2.

The method for determining the measurement parameters of the target measurement object and the third measurement object in the case that the priorities of the first measurement object and the second measurement object are different will be described in detail below with reference to the accompanying drawings and specific application examples.

Application Example One

The application scenario is shown in FIG. 5. Wherein, the preset time domain range is 160 ms, and MGRP=20 ms, then the preset time domain range includes 8 MGs from MG #0 to MG #7. This application example belongs to the case where the processing time of the short-period PRS in MG #j conflicts with the processing time of the long-period PRS layer in MG #j-n. As shown in FIG. 5, the terminal device is configured with two PRS frequency layers with different periods and time offsets and an inter-frequency measurement object (MO), and the inter-frequency MO is SSB or CSI-RS. Wherein, the two PRS frequency layers include a long-period PRS layer 1 and a short-period PRS layer 2.

The processing delay T1 of PRS layer 1 is relatively long (e.g., T1=35 ms). If the PRS layer 1 is measured in MG #0, its processing time will conflict with PRS layer 2 in MG #1. Considering that PRS layer 1 is in long cycle and has a higher measurement priority, MG #1 will not be used for PRS layer 2 measurement, while it can still be used for SSB or CSI-RS measurement.

For short period PRS layer 2:
$M_{intra,i,j=1}=M_{inter,i,j=1}=M_{tot,i,j=1}=0$, that is, in MG #1, the number of measurement objects of same frequency, the number of measurement objects of different frequencies, and the total number of the measurement objects are all 0. The short-period PRS layer 2 cannot be measured in MG #1.

MG #1 is not an available MG of the short-period PRS layer 2, and the short-period PRS layer 2 does not consider MG #1 when calculating the number of available MGs. In this application example, there are 4 MGs (MG #1/3/5/7) in which the PRS layer 2 can be taken as the measurement object within 160 ms, wherein the MG #1 is conflict with the processing time of the measurement of the long-period PRS layer 1 in MG #0, MG #1 will be used for long-period PRS layer #1 measurement, thus $R_{i=2}=4/3$.

For inter-frequency MO such as SSB or CSI-RS:
When counting the total number of measurement objects $M_{tot,i,j}$ and the number of inter-frequency measurement objects $M_{inter,i,j}$ for MG #1, only the number of inter-frequency MO is considered, and the PRS layer 2 is not considered. Therefore, in this application example, $M_{inter,i,j}=M_{tot,i,j}=1$.

The $R_i$ of the inter-frequency MO is the maximum ratio of the number of MGs that can use the inter-frequency MO as the object to be measured to the number of MGs that can use the inter-frequency MO as the object to be measured and are not used for long-period PRS measurement. In this application example, there are 2 MGs that can be used as the objects to be measured for inter-frequency MO within 160 ms, such as SSB or CSI-RS, and none of them will be used for long-period PRS measurement, so $R_i=1$.

Application Example Two

The application scenario is shown in FIG. 6, wherein the preset time domain range is 160 ms, and MGRP=20 ms, then the preset time domain range includes 8 MGs from MG #0 to MG #7. This application example belongs to the case where the processing time of the short-period PRS layer in MG #j conflicts with the long-period PRS in subsequent MG #j+n. As shown in FIG. 6, the terminal device is configured with three PRS frequency layers and one inter-frequency measurement object (MO), wherein the inter-frequency MO is SSB or CSI-RS. Wherein, the three PRS frequency layers include a long-period PRS layer 1, a short-period PRS layer 2 and a short-period PRS layer 3.

The processing delay T2 of PRS layer 2 is relatively long (e.g., 35 ms). If PRS layer 2 is measured in MG #1, its processing time will conflict with the long-period PRS layer 1 in MG #2. Considering that PRS layer 1 is a long cycle and has a higher measurement priority, the MG #1 will not be used for PRS layer 2 measurement, while it can still be used for the measurement of the SSB/CSI-RS and the PRS layer 3 with a shorter processing time T3.

For short period PRS layer 2:
$M_{intra,i,j=1}=M_{inter,i,j=1}=M_{tot,i,j=1}=0$, that is, in MG #1, the number of measurement objects of same frequency, the number of measurement objects of different frequencies, and the total number of the measurement objects are all 0. The short-period PRS layer 2 cannot be measured in MG #1.

The short-period PRS layer 2 does not consider MG #1 when calculating the number of available MGs. In this application example, there are 4 MGs (MG #1/3/5/7) in which the PRS layer 2 can be taken as the measurement object within 160 ms, wherein the processing time in the MG #1 is conflict with the measurement of the long-period PRS layer 1 in MG #2, thus $R_{i=2}=4/3$.

For short period PRS layer 3:

Since the PRS layer 2 is not measured in MG #1, and MG #1 is not used for long-period PRS measurement, therefore, the PRS layer 3 can be measured in MG #1. Competing inter-frequency measurement objects include the inter-frequency MO and the PRS layer 3, therefore, $M_{inter,i,j=1}=M_{tot,i,j=1}=2$.

MG #1 is an available MG of PRS layer 3, and other MGs do not conflict with long-period PRS measurement, and are not used for long-period PRS measurement. Therefore, all MGs where PRS layer 3 is located are available MG, so $R_i=1$.

For inter-frequency MO such as SSB or CSI-RS:

When counting the total number of measurement objects $M_{tot,i,j}$ and the number of inter-frequency measurement objects $M_{inter,i,j}$ for MG #1, only the number of inter-frequency MO and the number of the short-period PRS layer 3 that does not conflict with the long-period PRS layer 1 are considered, while the PRS layer 2 with relative long processing time and is conflict with the long-period PRS layer 1 is not considered. Therefore, in this application example, $M_{inter,i,j}=M_{tot,i,1}=2$.

The $R_i$ of the inter-frequency MO is the maximum ratio of the number of MGs that can use the inter-frequency MO as the object to be measured to the number of MGs that can use the inter-frequency MO as the object to be measured and are not used for long-period PRS measurement. In this application example, all MGs where the inter-frequency MO is located will not be used for long-period PRS measurement, so $R_i=1$.

In the above example, the available MG ratio information $R_i$ and the number of competing objects include the number of intra-frequency measurement objects $M_{intra,i,j}$, the number of inter-frequency measurement objects $M_{inter,i,j}$ and the total number of measurement objects $M_{tot,i,j}$, and the application method when calculating the CSSF can refer to formulas (1)-(3) in the scheme of sharing MG above.

The above describes how to determine the measurement parameter of the target measurement object and the third measurement object when the priorities of the first measurement object and the second measurement object are different. But the present application is not limited thereto. In some exemplary embodiments of the present application, the priorities of the first measurement object and the second measurement object may also be the same. For example, both the first measurement object and the second measurement object are short-period measurement objects, or both the first measurement object and the second measurement object are long-period measurement objects.

In the case that the priority of the first measurement object is the same as that of the second measurement object, determining the measurement parameter of the target measurement object includes:

determining a first scaling factor of the first measurement object in the p-th MG within the preset time domain range, according to the number of MGs with PRS in the processing time of the first signal to be measured and/or the number of MGs with PRS in the processing time of the second signal to be measured, wherein the p-th MG is the MG where the first signal to be measured is located, and p is a positive integer.

In the embodiment, the first signal to be measured is located in the p-th MG, that is, the first measurement object conflicts with the second measurement object in the p-th MG due to processing time. In the embodiment of the present application, for the measurement object i that conflicts due to the processing time in the p-th MG, when calculating the first scaling factor $A_{i,p}$ in the p-th MG, the conflict caused by the previous measurement object to the measurement object i may be considered, and the conflict caused by the measurement object i to other subsequent measurement objects may also be considered.

In some exemplary embodiments of the present application, the first scaling factor is calculated for all measurement objects that conflict due to processing time. That is to say, for the second measurement object, the first scaling factor of the second measurement object in the MG where the second signal to be measured is located is also calculated.

Specifically, according to the number of MGs with PRS in the processing time of the second signal to be measured, and/or the number of MGs with PRS in the processing time of the fourth signal to be measured before the second signal to be measured, the first scaling factor of the second object to be measured in the q-th MG within the preset time domain range is determined. Wherein, the q-th MG is the MG where the second signal to be measured is located, q is a positive integer, and the processing time of the fourth signal to be measured includes the q-th MG.

In practical applications, determining the first scaling factor of the first measurement object in the p-th MG within the preset time domain range may be implemented based on at least one of the following information:

(1) The number of MGs with PRS in the processing time of the first signal to be measured;
(2) The number of MGs with PRS in the processing time of the second signal to be measured;
(3) The sum of the number of MGs with PRS in the processing time of the first signal to be measured and the number of MGs with PRS in the processing time of the second signal to be measured;
(4) The maximum value of the number of MGs with PRS in the processing time of the first signal to be measured and the number of MGs with PRS in the processing time of the second signal to be measured.

Exemplarily, the number of MGs involved in simultaneous conflict between the first signal to be measured and the signals to be measured of all other measurement objects except the first measurement object can be used as the first scaling factor of the first measurement object in the p-th MG. The following describes in detail with reference to the accompanying drawings and specific application examples.

Application Example Three

Figure 7:
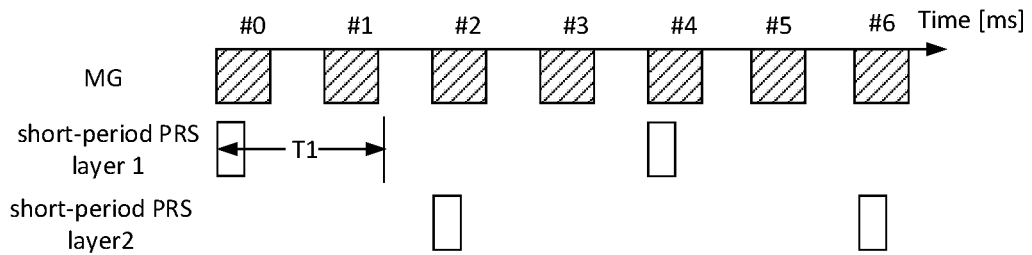
FIG. 7 is a schematic diagram of application example 3 of the method for determining the measurement parameters of the present application.

The application scenario is shown in FIG. 7, the terminal device is configured with two short-period PRS frequency layers, including the short-period PRS layer 1 and the short-period PRS layer 2.

The first scaling factor of PRS layer 1 in MG #0 and MG #4 is $A_{i=1,p}=1$.

The processing time of PRS layer 1 is relatively long, and its processing time of the measurement in MG #0 will include subsequent MG #1, but there is no other PRS layer in MG #1, so there is no subsequent signals to be measured that conflicts with PRS layer 1. Moreover, there is no other prior signal to be measured that causes conflicts to PRS layer 1, therefore, the number of conflicting MGs is 1, which is represented in the fact that the MG with PRS during the processing time of the measurement of PRS layer 1 in the MG #0 includes only MG #0, therefore, $A_{i=1,p=1}=1$. Similarly, for MG #4, $A_{i=1,p=4}=1$.

The first scaling factor of the PRS layer 2 in MG #2 or MG #6 is $A_{i=2,\ p}=1$.

The processing time of PRS layer 2 itself is very short, and the processing time of the measurement in MG #2 does not include any subsequent MGs, and does not conflict with other PRS layer 1 measurements before MG #2. The number of conflicting MGs is 1, represented in the fact that the MG with PRS during the processing time of the measurement of PRS layer 2 in MG #2 includes only MG #2, therefore, $A_{i=2,p=2}=1$. Similarly, for MG #6, $A_{i=2,p=6}=1$.

Application Example Four

Figure 8:
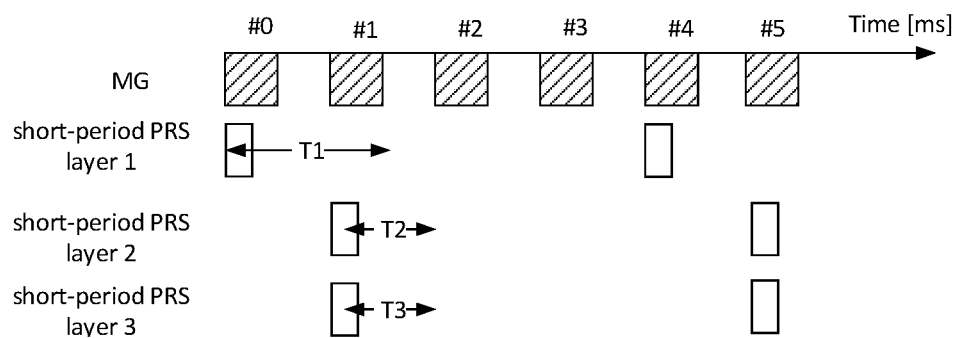
FIG. 8 is a schematic diagram of application example 4 of the method for determining the measurement parameters of the present application.

The application scenario is shown in FIG. 8, the terminal device is configured with three short-period PRS frequency layers, including a short-period PRS layer 1, a short-period PRS layer 2 and a short-period PRS layer 3.

The first scaling factor of PRS layer 1 in MG #0 is $A_{i=1,p=0}=2$.

The processing time of PRS layer 1 is relatively long, and its processing time of the measurement in MG #0 will include the subsequent MG #1, which will cause conflicts with PRS layer 2 and layer 3 in MG #1, so the number of conflict MGs is 2, which is represented in the fact that the MGs with PRS during the processing of the measurement of the PRS layer 1 in MG #0 include the MG #0 and MG #1. Therefore, $A_{i=1,p=0}=2$.

The first scaling factor of PRS layer 2 in MG #1 is $A_{i=2,p=1}=2$.

The processing time of PRS layer 2 itself is very short, and its processing time of the measurement in MG #1 will not affect any subsequent MGs, while the processing time of PRS layer 1 in MG #0 is relatively long, which will include MG #1, so that the PRS layer 2 measurement in MG #1 conflicts with the PRS layer 1 measurement in MG #0, and the number of conflicting MGs is 2. It is represented in the fact that the MGs with PRS during the processing of the measurement of the PRS layer 1 in MG #0 include the MG #0 and MG #1. Therefore, $A_{i=2,p=1}=2$.

For the first scaling factor of PRS layer 3 in MG #1, it is the same as the case of PRS layer 2 in MG #1, therefore, $A_{i=3,p=1}=2$.

It can be seen that since PRS layer 2 and layer 3 are in the same position, they are competing for the same MG, which has already been reflected in $M_{inter}$ and $M_{tot}$. Therefore, when calculating the scaling factor A, it is calculated according to the number of MG, rather than based on the number of PRS, and thus it can avoid repeated statistics.

Application Example Five

Figure 9:
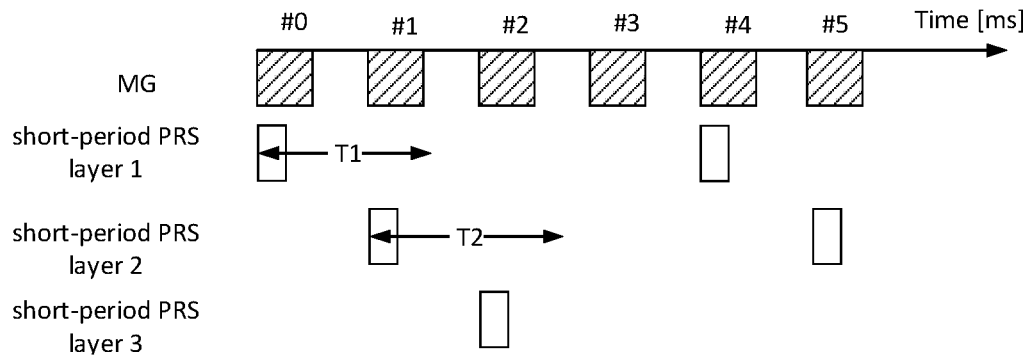
FIG. 9 is a schematic diagram of application example 5 of the method for determining the measurement parameters of the present application.

The application scenario is shown in FIG. 9, the terminal device is configured with three short-period PRS frequency layers, including a short-period PRS layer 1, a short-period PRS layer 2 and a short-period PRS layer 3.

The first scaling factor of PRS layer 1 in MG #0 is $A_{i=1,p=0}=2$.

The processing time of PRS layer 1 is relatively long, and its processing time of the measurement in MG #0 will include the subsequent MG #1, resulting in the conflict with PRS layer 2 in MG #1, so the number of the conflicting MG is 2, which is represented by the fact that the MGs with PRS during the processing of the measurement of the PRS layer 1 in MG #0 include the MG #0 and MG #1. Therefore, $A_{i=1,p=0}=2$.

The first scaling factor of PRS layer 2 in MG #1 is $A_{i=2,p=1}=2$.

The PRS layer 2 in MG #1 will be covered by the processing time of PRS layer 1 in MG #0, and the processing time of PRS layer 2 itself is relatively long, and it will also conflict with PRS layer 3 in MG #2. However, the conflicts with MG #0 and MG #2 are not simultaneous, for example, if PRS layer 1 is measured in MG #0, then PRS layer 2 cannot be measured in MG #1, and PRS layer 3 can be measured in MG #2. That is, there is no conflict between measuring PRS layer 1 in MG #0 and measuring PRS layer 3 in MG #2, and they can be performed simultaneously. The number of conflicting MGs occurring at the same time is 2. It is represented in the fact that the MGs with PRS during the processing of the measurement of the PRS layer 1 in MG #0 include the MG #0 and MG #1 and the number thereof is 2; and the MGs with PRS during the processing of the measurement of the PRS layer 2 in MG #1 include the MG #1 and MG #2. Therefore, $A_{i=2,p=1}=2$.

The first scaling factor of PRS layer 3 in MG #2 is $A_{i=3,p=2}=2$.

The processing time of PRS layer 3 itself is short, and its processing time of the measurement in MG #2 will not affect processing time of any subsequent MGs, but the processing time of PRS layer 2 in MG #1 is relatively long, which will include MG #2, thereby causing the PRS layer 3 measurement in MG #2 conflicts with the PRS layer 2 measurement in MG #1, and the number of conflicting MGs is 2. It is represented in the fact that the MGs with PRS during the processing of the measurement of the PRS layer 2 in MG #1 include the MG #1 and MG #2, and therefore $A_{i=3,p=2}=2$.

Application Example Six

Figure 10:
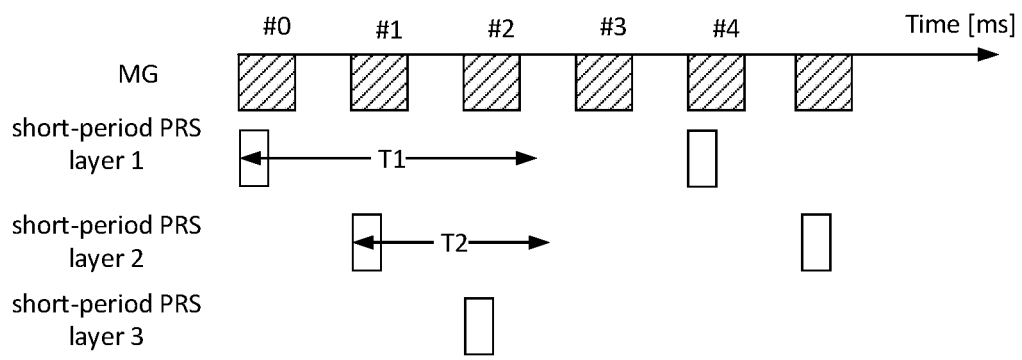
FIG. 10 is a schematic diagram of application example 6 of the method for determining the measurement parameters of the present application.

The application scenario is shown in FIG. 10, the terminal device is configured with three short-period PRS frequency layers, including a short-period PRS layer 1, a short-period PRS layer 2 and a short-period PRS layer 3.

The first scaling factor of PRS layer 1 in MG #0 is $A_{i=1,p=0}=3$.

The processing time of PRS layer 1 is relatively long, and its processing time of the measurement in MG #0 will include subsequent MG #1 and MG #2, resulting in confliction with the PRS layer 2 and layer 3 in MG #1, and the PRS layer 2 measurement in MG #1 is also conflicted with the PRS layer 3 measurement in MG #2. That is, only one of the three MGs of MG #0/1/2 can be used for PRS measurement, and thus the number of conflicting MGs at the same time is 3. It is represented in the fact that the MGs with PRS during the processing of the measurement of the PRS layer 1 in MG #0 include the MG #0, MG #1 and MG #2, and therefore $A_{i=1,p=0}=3$.

The first scaling factor of PRS layer 2 in MG #1, and the first scaling factor of PRS layer 3 in MG #2 are similar to the case of PRS layer 1 in MG #0, only one of the three MGs MG #0/1/2 can be used for PRS measurement, and the number of conflicting MGs is 3. Therefore, $A_{i=2,\ 1=1}=3$, and $A_{i=3,p=2}=3$.

In the embodiment of the present application, the first scaling factor is determined based on the foregoing manner, and further, various exemplary application manners of the first scaling factor are also provided.

As an exemplary application manner, the method for determining the measurement parameter further includes:

determining a carrier-specific scaling factor CSSF of the first measurement object according to the first scaling factor of the first measurement object in the p-th MG; and determining the measurement cycle of the first measurement object according to the CSSF of the first measurement object.

For example, p=j, and the first scaling factor of the first measurement object in the j-th MG is $A_{i,j}$, if the first measurement object is the short-period PRS frequency layer, then when the parameter measGapSharingScheme indicates that the MG sharing scheme is the equal sharing scheme, the CSSF of the first measurement object is:

$CSSF_{PRS,i}$=max(ceil($R_i \times M_{tot,i,j} \times A_{i,j}$)),j=0 . . . (160/ MGRP)−1      Formula (7)

When the parameter measGapSharingScheme indicates that the MG sharing scheme is the non-equal sharing scheme, the CSSF of the first measurement object is the maximum value of the following:

ceil($R_i \times K_{inter} \times M_{inter,i,j} \times A_{i,j}$),$M_{intra,i,j}$=0 . . . (160/ MGRP)−1;

ceil($R_i \times M_{inter,i,j} \times A_{i,j}$),$M_{intra,i,j}$=0 . . . (160/MGRP)−1.      Formula (8)

In the embodiment, $K_{inter}$ depends on the configuration of the parameter measGapSharingScheme.

For the calculation of the above $R_i$ and $M_{inter,i,j}$ reference may be made to the foregoing embodiments.

If the first measurement object is the long-period PRS frequency layer, the CSSF of the first measurement object, i.e., $CSSF_{PRS,i}$ is calculated as follows:

$CSSF_{PRS,i}$=max(ceil($M_{tot,i,j} \times A_{i,j}$)), or $CSSF_{PRS,i}$=max(ceil($R_i \times M_{tot,j} \times \times A_{i,j}$)),j=0 . . . (160/ MGRP)−1.

In the embodiment, since the measurement priority of the long-period PRS is higher than that of the SSB/CSI-RS measurement and the short-period PRS measurement, only the number of long-period PRS layers is considered when counting the $M_{tot,i}$, while the SSB/CSI-RS measurements and the short-period PRS measurements are not included in the statistics. The $M_{tot,i}$, is the number of long-period PRS layers in MG #j. Without scaling $R_i$ or fixing $R_i$ to 1, multiple long-period PRS layers compete for MG in an evenly distributed manner, which is not controlled by measGapSharingScheme.

Based on the calculated CSSF of the first measurement object, the measurement cycle of the first measurement object can be calculated with reference to the above formula (5).

As an exemplary application manner, the method for determining the measurement parameters further includes:

determining a second scaling factor of the first measurement object based on the first scaling factor of the first measurement object in the p-th MG; and determining the measurement cycle of the first measurement object according to the CSSF and the second scaling factor of the first measurement object.

For example, p=j, and the first scaling factor of the first measurement object in the j-th MG is $A_{i,j}$, then the second scaling factor of the first measurement object is the maximum value of the first scaling factor of the first measurement object in each MG, i.e., the second scaling factor of the first measurement object is:

$A_i$=max($A_{i,j}$),j=0 . . . (160/MGRP)−1.      Formula (9)

Based on the second scaling factor $A_i$ of the first measurement object, the measurement cycle can be calculated according to the following formula:

$$T_{PRS-RSTD,i} = \left( CSSF_{PRS,i} * A_i * N_{RxBeam,i} * \left\lceil \frac{N_{PRS,i}^{slot}}{N'} \right\rceil \left\lceil \frac{L_{PRS,i}}{N} \right\rceil * N_{sample} - 1 \right) * T_{effect,i} + T_{last}$$      Formula (10)

In the embodiment, the specific meaning of each variable can refer to the foregoing embodiments.

In the embodiment, if the first measurement object is the short-period PRS frequency layer, the CSSF of the first measurement object, i.e., $CSSF_{PRS,i}$ is calculated as follows:

When the parameter measGapSharingScheme indicates that the scheme of sharing MG is an equal sharing scheme, the CSSF of the first measurement object is:

$CSSF_{PRS,i}$=max(ceil($R_i \times M_{tot,i,j}$)),j=0 . . . (160/ MGRP)−1;      formula (11)

When the parameter measGapSharingScheme indicates that the MG sharing scheme is a non-equal sharing scheme, the CSSF of the first measurement object is the maximum value of the following:

ceil($R_i \times K_{inter} \times M_{inter,i,j}$),$M_{intra,i,j}\ne$0,j=0 . . . (160/ MGRP)−1; and ceil($R_i \times M_{inter,i,j}$),$M_{intra,i,j}$=0,j=0 . . . (160/MGRP)−1.      Formula (12)

If the first measurement object is the long-period PRS frequency layer, the CSSF of the first measurement object, i.e., $CSSF_{PRS,i}$ is calculated as follows:

$CSSF_{PRS,i}$=max(ceil($M_{tot,i,j} \times A_{i,j}$)), or $CSSF_{PRS,i}$=max(ceil($R_i \times M_{tot,i,j} \times k_{i,j}$)), where j=0 . . . (160/MGRP)−1;

In the embodiment, since the measurement priority of the long-period PRS is higher than that of the SSB/CSI-RS measurement and the short-period PRS measurement, only the number of long-period PRS layers is considered when counting the $M_{tot,i}$, while the SSB/CSI-RS measurements and short-period PRS measurements are not included in the statistics. $M_{tot,i}$, is the number of long-period PRS layers in MG #j. Without scaling $R_i$ or fixing $R_i$ to 1, multiple long-period PRS layers compete for the MG in an evenly distributed manner, which is not controlled by measGapSharingScheme.

The above describes the specific configuration and implementation of the embodiments of the present application from different perspectives through multiple embodiments. Using at least one of the above embodiments, it is first determined whether the first signal to be measured is within the processing time of the second signal to be measured, that is, whether the measurement of the first measurement object and the measurement of the second measurement object conflict due to the processing time, and the measurement parameter of the target measurement object is determined when the first signal to be measured is within the processing time of the second signal to be measured. Since the relationship between the processing time of the first measurement object and the second measurement object is taken into consideration, it is possible to avoid conflicts in the measurement of different measurement objects due to the processing time, and to optimize the measurement parameter and the measurement cycle.

Figure 11:
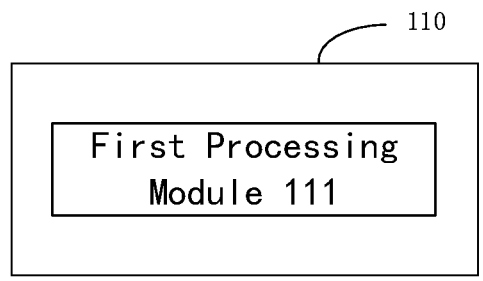
FIG. 11 is a schematic structural block diagram of a terminal device according to an embodiment of the present application.

Corresponding to the processing method in at least one of the above embodiments, the embodiment of the present application further provides a terminal device 110, referring to FIG. 11, which includes:

a first processing module 111, configured to determine a measurement parameter of a target measurement object among the plurality of measurement objects according to the processing time of the plurality of measurement objects; wherein the measurement parameter is used to determine a measurement cycle of the target measurement object.

Optionally, the plurality of measurement objects includes a first measurement object and a second measurement object, and the target measurement object includes at least one of the first measurement object and the second measurement object, the first measurement object includes a first signal to be measured, and the second measurement object includes a second signal to be measured. The first processing module is configured to determine the measurement parameter of the target measurement object in a case that the first signal to be measured is within the processing time of the second signal to be measured.

Optionally, the first measurement object and the second measurement object each includes a positioning reference signal PRS frequency layer.

Optionally, the priorities of the first measurement object and the second measurement objection are different, and the target measurement object includes a measurement object with a lower priority among the first measurement object and the second measurement object.

Optionally, a target signal to be measured in the target measurement object is located in a j-th MG within a preset time domain range; wherein the target signal to be measured is the first signal to be measured or the second signal to be measured, and j is a positive integer.

Optionally, the first processing module is configured to:
determine that a number of competing objects of the target measurement object in the j-th MG is 0; and/or
determine an available MG of the target measurement object from other MGs except the j-th MG within the preset time domain range, and determining an available MG ratio information of the target measurement object based on a number of the available MG of the target measurement object.

Figure 12:
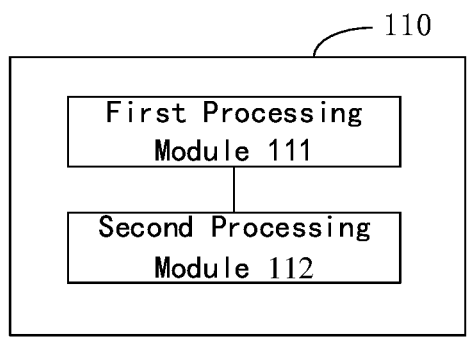
FIG. 12 is a schematic structural block diagram of a terminal device according to another embodiment of the present application.

Optionally, referring to FIG. 12, the terminal device further includes:
a second processing module 112, configured to determine a measurement parameter of a third measurement object; wherein, the third measurement object includes a third signal to be measured located in the j-th MG.

Optionally, the second processing module is configured to:
determine a number of competing objects of the third measurement object in the j-th MG according to a number of signals to be measured other than the target signal to be measured in the j-th MG.

Optionally, the third measurement object includes at least one of the following:
a synchronization signal block SSB; and
a channel state information reference signal CSI-RS.

Optionally, in a case where the target measurement object includes the second measurement object, the third measurement object includes:

a PRS frequency layer having a same priority as the target measurement object;
wherein, the processing time of the third signal to be measured in the PRS frequency layer having the same priority as the target measurement object does not includes the MG where the first signal to be measured is located.

Optionally, the first measurement object has a same priority as the second measurement object.

Optionally, the first processing module is configured to:
determine a first scaling factor of the first measurement object in a p-th MG within the preset time domain range according to a number of MGs with PRS in the processing time of the first signal to be measured and/or a number of MGs with PRS in the processing time of the second signal to be measured, wherein the p-th MG is an MG where the first signal to be measured is located, and p is a positive integer.

Optionally, the first processing module is further configured to:
determine a carrier-specific scaling factor CSSF of the first measurement object according to the first scaling factor of the first measurement object in the p-th MG; and
determine the measurement cycle of the first measurement object according to the CSSF of the first measurement object.

Optionally, the first processing module is further configured to:
determine a second scaling factor of the first measurement object according to the first scaling factor of the first measurement object in the p-th MG; and
determine the measurement cycle of the first measurement object according to a CSSF of the first measurement object and the second scaling factor.

The terminal device 110 in the embodiment of the present application can implement the corresponding functions of the terminal device in the foregoing method embodiments. For the processes, functions, implementations, and beneficial effects corresponding to each module (submodule, unit, or component, etc.) in the terminal device 110, reference can be made to the corresponding descriptions in the foregoing method embodiments, and details are not repeated here.

It should be noted that the functions described by the various modules (submodules, units or components, etc.) in the terminal device 110 in the embodiment of the present application may be implemented by different modules (submodules, units or components, etc.), or implemented by the same module (submodule, unit or component, etc.). For example, the first sending module and the second sending module may be different modules, or may be the same module, both of which can implement corresponding functions of the terminal device in the embodiment of the present application.

Figure 13:
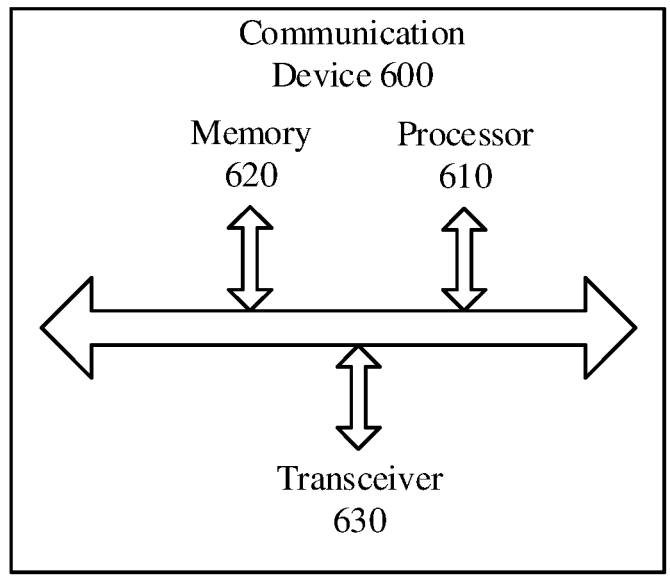
FIG. 13 is a schematic block diagram of a communication device according to an embodiment of the present application.

FIG. 13 is a schematic structural diagram of a communication device 600 according to an embodiment of the present application, wherein the communication device 600 includes a processor 610, and the processor 610 can invoke and run a computer program from a memory, so as to implement the method in the embodiment of the present application.

Optionally, the communication device 600 may further include a memory 620. Wherein, the processor 610 can invoke and run a computer program from the memory 620, so as to implement the method in the embodiment of the present application.

The memory 620 may be an independent device independent of the processor 610, or may be integrated in the processor 610.

Optionally, the communication device 600 may further include a transceiver 630, and the processor 610 may control the transceiver 630 to communicate with other devices, specifically, to send information or data to other devices, or receive information or data sent by other devices.

The transceiver 630 may include a transmitter and a receiver. The transceiver 630 may further include an antenna(s), and the number of the antenna may be one or more.

Optionally, the communication device 600 may be the terminal device of the embodiment of the present application, and the communication device 600 may implement the corresponding processes implemented by the terminal device in the methods of the embodiment of the present application. For the sake of brevity, it will not be repeated herein.

Figure 14:
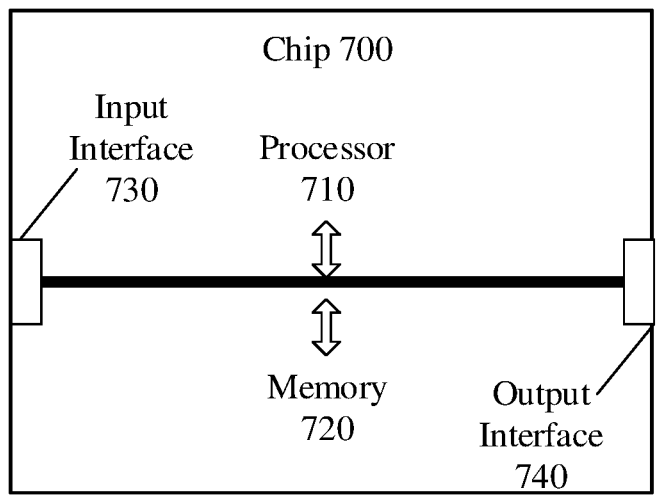
FIG. 14 is a schematic block diagram of a chip according to an embodiment of the present application.

FIG. 14 is a schematic structural diagram of a chip 700 according to an embodiment of the present application, wherein the chip 700 includes a processor 710, and the processor 710 can invoke and run a computer program from a memory, so as to implement the method in the embodiment of the present application.

Optionally, the chip 700 may further include a memory 720. The processor 710 may invoke and run a computer program from the memory 720, so as to implement the method in the embodiment of the present application.

The memory 720 may be an independent device independent of the processor 710, or may be integrated in the processor 710.

Optionally, the chip 700 may also include an input interface 730. The processor 710 can control the input interface 730 to communicate with other devices or chips, specifically, can obtain information or data sent by other devices or chips.

Optionally, the chip 700 may also include an output interface 740. The processor 710 can control the output interface 740 to communicate with other devices or chips, specifically, can output information or data to other devices or chips.

Optionally, the chip can be applied to the terminal device of the embodiment of FIG. 11 or FIG. 12, and the chip can implement the corresponding processes implemented by the terminal device in the methods of the embodiments of the present application. For the sake of brevity, it will not be repeated herein.

It should be understood that the chip mentioned in the embodiment of the present application may also be referred to as a system level chip, a system chip, a chip system or a system-on-chip.

The processor mentioned above can be a general-purpose processor, a digital signal processor (DSP), a field programmable gate array (FPGA), an application specific integrated circuit (ASIC) or other programmable logic devices, transistor logic devices, discrete hardware components, etc. Wherein, the general-purpose processor mentioned above may be a microprocessor or any conventional processor or the like.

The aforementioned memories may be volatile memories or nonvolatile memories, or may include both volatile and nonvolatile memories. The non-volatile memory can be read-only memory (ROM), programmable read-only memory (programmable ROM, PROM), erasable programmable read-only memory (erasable PROM, EPROM), electrically erasable programmable read-only memory (electrically EPROM, EEPROM) or flash memory. The volatile memory may be random access memory (RAM).

It should be understood that the above-mentioned memory is illustrative but not restrictive. For example, the memory in the embodiment of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM) and direct rambus random access memory (Direct Rambus RAM, DR RAM) and so on. That is, the memory in the embodiments of the present application is intended to include, but not be limited to, these and any other suitable types of memory.

Figure 15:
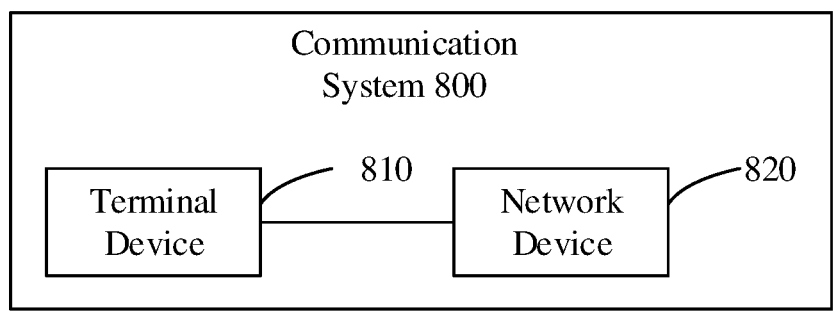
FIG. 15 is a schematic block diagram of a communication system according to an embodiment of the present application.

FIG. 15 is a schematic block diagram of a communication system 800 according to an embodiment of the present application. The communication system 800 includes a terminal device 810 and a network device 820.

In the embodiment, the terminal device 810 may be used to implement corresponding functions implemented by the terminal device in the methods of various embodiments of the present application. For the sake of brevity, details are not repeated here.

In the above embodiments, all or part of them may be implemented by software, hardware, firmware or any combination thereof. When implemented using software, it may be implemented in whole or in part in the form of a computer program product. The computer program product includes one or more computer instructions. When the computer program instructions are loaded and executed on the computer, the processes or functions according to the embodiments of the present application will be implemented in whole or in part. The computer can be a general-purpose computer, a special purpose computer, a computer network, or other programmable device. The computer instructions may be stored in or transmitted from one computer-readable storage medium to another computer-readable storage medium, for example, the computer instructions may be transferred from a website, computer, server, or data center by wire (such as coaxial cable, optical fiber, digital subscriber line (DSL)) or wireless (such as infrared, wireless, microwave, etc.) to another website site, computer, server or data center. The computer-readable storage medium may be any available medium that can be accessed by a computer, or a data storage device such as a server or a data center integrated with one or more available media. The available medium may be a magnetic medium (such as a floppy disk, a hard disk, or a magnetic tape), an optical medium (such as a DVD), or a semiconductor medium (such as a solid state disk (SSD)), etc.

It should be understood that, in various embodiments of the present application, the sequence numbers of the above-mentioned processes do not mean the order of execution, and the execution order of the processes should be determined by their functions and internal logic, and should not be used in the embodiments of the present application. The implementation process constitutes any limitation.

Those skilled in the art can clearly understand that for the convenience and brevity of the description, the specific operating process of the above-described system, device and unit can refer to the corresponding process in the foregoing method embodiment, which will not be repeated here.

The above is only the specific implementation of the application, but the scope of protection of the application is not limited thereto. Anyone familiar with the technical field can easily think of changes or substitutions within the technical scope disclosed in the application, which should be covered within the scope of protection of this application. Therefore, the protection scope of the present application should be based on the protection scope of the claims.

What is claimed is:

1. A measurement parameter determining method, comprising:
   determining a measurement parameter of a target measurement object among a plurality of measurement objects according to processing times of the plurality of measurement objects, wherein the measurement parameter is used to determine a measurement cycle of the target measurement object,
   wherein the plurality of measurement objects comprises a first measurement object and a second measurement object, and the target measurement object comprises at least one of the first measurement object and the second measurement object, the first measurement object comprises a first signal to be measured, and the second measurement object comprises a second signal to be measured; and
   the determining the measurement parameter of the target measurement object among the plurality of measurement objects according to the processing times of the plurality of measurement objects, comprises:
   determining the measurement parameter of the target measurement object in a case that the first signal to be measured is within the processing time of the second signal to be measured,
   wherein a target signal to be measured in the target measurement object is located in a j-th measurement gap MG within a preset time domain range; wherein the target signal to be measured is the first signal to be measured or the second signal to be measured, and j is a positive integer,
   wherein the method further comprises:
   determining a measurement parameter of a third measurement object; wherein, the third measurement object comprises a third signal to be measured located in the j-th MG,
   wherein the determining the measurement parameter of the third measurement object comprises:
   determining a number of competing objects of the third measurement object in the j-th MG according to a number of signals to be measured other than the target signal to be measured in the j-th MG.

2. The method according to claim 1, wherein the first measurement object and the second measurement object each comprise a positioning reference signal PRS frequency layer.

3. The method according to claim 1, wherein the target measurement object comprises a measurement object with a lower priority among the first measurement object and the second measurement object.

4. The method according to claim 1, wherein the determining the measurement parameter of the target measurement object comprises at least one of the following:
   determining that a number of competing objects of the target measurement object in the j-th MG is 0; and
   determining an available MG of the target measurement object from other MGs except the j-th MG within the preset time domain range, and determining an available MG ratio information of the target measurement object based on a number of the available MG of the target measurement object.

5. The method according to claim 1, wherein the third measurement object comprises at least one of the following:
   a synchronization signal block SSB; and
   a channel state information reference signal CSI-RS.

6. The method according to claim 1, wherein, in a case where the target measurement object comprises the second measurement object, the third measurement object comprises:
   a PRS frequency layer having a same priority as the target measurement object;
   wherein, the processing time of the third signal to be measured in the PRS frequency layer having the same priority as the target measurement object does not comprise the MG where the first signal to be measured is located.

7. A terminal device, comprising: a processor and a memory, the memory is configured to store a computer program, and the processor is configured to invoke and run the computer program stored in the memory, to:
   determine a measurement parameter of a target measurement object among a plurality of measurement objects according to processing times of the plurality of measurement objects, wherein the measurement parameter is used to determine a measurement cycle of the target measurement object,
   wherein the plurality of measurement objects comprises a first measurement object and a second measurement object, and the target measurement object comprises at least one of the first measurement object and the second measurement object, the first measurement object comprises a first signal to be measured, and the second measurement object comprises a second signal to be measured; and
   the processor is configured to determine the measurement parameter of the target measurement object in a case that the first signal to be measured is within the processing time of the second signal to be measured,
   wherein a target signal to be measured in the target measurement object is located in a j-th measurement gap MG within a preset time domain range; wherein the target signal to be measured is the first signal to be measured or the second signal to be measured, and j is a positive integer,
   wherein the processor is configured to:
   determine a measurement parameter of a third measurement object; wherein, the third measurement object comprises a third signal to be measured located in the j-th MG,
   wherein the processor is configured to:
   determine a number of competing objects of the third measurement object in the j-th MG according to a number of signals to be measured other than the target signal to be measured in the j-th MG.

8. The terminal device according to claim 7, wherein the first measurement object and the second measurement object each comprise a positioning reference signal PRS frequency layer.

9. The terminal device according to claim 7, wherein the target measurement object comprises a measurement object with a lower priority among the first measurement object and the second measurement object.

10. The terminal device according to claim 7, wherein the processor is configured to:
- determine that a number of competing objects of the target measurement object in the j-th MG is 0; and/or
- determine an available MG of the target measurement object from other MGs except the j-th MG within the preset time domain range, and determining an available MG ratio information of the target measurement object based on a number of the available MG of the target measurement object.

11. The terminal device according to claim 7, wherein the third measurement object comprises at least one of the following:
- a synchronization signal block SSB; and
- a channel state information reference signal CSI-RS.

12. The terminal device according to claim 7, wherein, in a case where the target measurement object comprises the second measurement object, the third measurement object comprises:
- a PRS frequency layer having a same priority as the target measurement object;
- wherein, the processing time of the third signal to be measured in the PRS frequency layer having the same priority as the target measurement object does not comprise the MG where the first signal to be measured is located.

\* \* \* \* \*